US007024760B2

(12) United States Patent
Soriano

(10) Patent No.: US 7,024,760 B2
(45) Date of Patent: Apr. 11, 2006

(54) METHOD AND APPARATUS FOR EQUIPPING PLUG HOUSINGS WITH FITTED-OUT CABLE ENDS OF A CABLE

(75) Inventor: Louis Soriano, Aubagne (FR)

(73) Assignee: Komax Holding AG, Dierikon (CH)

( * ) Notice: Subject to any disclaimer, the term of this patent is extended or adjusted under 35 U.S.C. 154(b) by 293 days.

(21) Appl. No.: 10/755,758

(22) Filed: Jan. 12, 2004

(65) Prior Publication Data

US 2004/0143966 A1 Jul. 29, 2004

Related U.S. Application Data

(62) Division of application No. 10/113,406, filed on Apr. 1, 2002, now Pat. No. 6,961,996.

(30) Foreign Application Priority Data

Apr. 10, 2001 (EP) ................................. 01810355

(51) Int. Cl.
*B23P 19/00* (2006.01)

(52) U.S. Cl. ...................... 29/742; 29/33 M; 29/564.4; 29/742; 29/747; 29/753

(58) Field of Classification Search ............... 29/33 M, 29/564.4, 742, 747, 753
See application file for complete search history.

(56) References Cited

U.S. PATENT DOCUMENTS 4,581,796 A * 4/1986 Fukuda et al. ............. 29/33 M
4,628,600 A * 12/1986 Gordon et al. ................ 29/861
4,835,844 A * 6/1989 Gerst et al. .................... 29/747
4,864,718 A * 9/1989 Ricard .......................... 29/739
5,083,370 A * 1/1992 Koch et al. .................... 29/863
5,127,159 A * 7/1992 Kudo et al. .................... 29/863
5,157,830 A * 10/1992 Koch ........................... 29/857
5,315,756 A 5/1994 Jurjevic et al.
5,355,581 A 10/1994 Soriano
5,485,660 A * 1/1996 Pittau ........................... 29/718
6,662,444 B1 * 12/2003 Takada ......................... 29/866

FOREIGN PATENT DOCUMENTS

EP 0 286 206 10/1988
EP 0 817 333 1/1998

* cited by examiner

*Primary Examiner*—Carl J. Arbes
(74) *Attorney, Agent, or Firm*—Butzel Long

(57) ABSTRACT

An apparatus and a method for equipping plug housings with fitted-out cables includes an equipping installation downstream of a fitting-out installation and introduces each fitted-out cable end into a first or second plug housing according to an installation sequence. A feeder unit takes a cable loop from a transfer unit moved from the fitting-out installation and transfers the leading cable end to a transfer station and the trailing cable end either to a rotatable store unit or, to the transfer station when it is free. An equipping unit takes over the cable ends in succession at the second transfer station and introduces the cable ends into designed cells of the corresponding plug housings.

13 Claims, 7 Drawing Sheets

METHOD AND APPARATUS FOR EQUIPPING PLUG HOUSINGS WITH FITTED-OUT CABLE ENDS OF A CABLE

CROSS-REFERENCE TO RELATED APPLICATION

This application is a divisional of the U.S. patent application Ser. No. 10/113,406 filed Apr. 1, 2002 now U.S. Pat. No. 6,961,996.

BACKGROUND OF THE INVENTION

The present invention relates generally to a method and apparatus for equipping plug housings with fitted-out cable ends of a cable, wherein an equipping unit introduces the cable ends into cells of the plug housings in a specific cable sequence.

There is shown in the U.S. Pat. No. 4,835,844 an equipping device in which cables fitted with electrical contacts are intermediately stored at both ends in a rotatable store. For reception of the cable ends, the store has two wheels equipped with cable clamps. A cable feeder transfers the finished state fitted-out cable to the store, wherein each cable end is received by a respective wheel cable clamp in the equipping sequence. While the first store is loaded by the cable feeder, a second rotatable store is emptied of finished cables by an equipping device. Thereafter, the second store is loaded and the first store is emptied. The equipping device includes two cable grippers movable in three directions, wherein one cable gripper feeds one end of each cable to one plug housing and the other cable gripper feeds the other end of each cable to another plug housing.

A disadvantage of this known device is that the mechanical construction in terms of control, with two stores and two equipping devices, is very complex and expensive.

Equipment for equipping plug housings is shown in the U.S. Pat. No. 5,355,581 in which cables fitted with electrical contacts are intermediately stored at one end in a linear store. The leading cable end is introduced into a cell of the plug housing and the trailing cable end is intermediately stored in a cell of the linear store in accordance with the respective cable sequence of the plug housing. The trailing cable ends are then introduced in an ascending equipping sequence into the cells of the plug housing.

A disadvantage of this equipment is that the distances between the storage cells and the plug cells are large and thus the minimum cable length also has to be correspondingly large.

SUMMARY OF THE INVENTION

The present invention concerns a method and an apparatus for making fitting-out cables with connectors in a fitting-out installation that ensures good accessibility to the fitting-out units and enables simple and reliable operation of the installation. The fitted-out cables that have been produced can be removed from the fitting-out units in problem-free manner and the installation can be furnished with plug housings into which it installs the fitted-out cables in simple manner. The installation is simple in construction and economic in production. Cables with greatly different lengths can be processed by the installation according to the present invention without tangling occurring.

The method of equipping plug housings with fitted-out cable ends of cables, wherein an equipping unit introduces the cable ends into cells of the plug housings in a specific cable installation sequence, comprises the steps of: a) positioning a leading end of a cable at a transfer station; b) removing the leading end of the cable from the transfer station and installing the leading end into a cell of a first plug housing; c) positioning a trailing end of the cable at the transfer station; d) removing the trailing end of the cable from the transfer station and installing the trailing end into a cell of a second plug housing; and e) positioning the trailing end of the cable in a store unit prior to performing said steps c. and d. and removing the trailing end from the store unit subsequent to performing at least said steps a. through d. for at least another cable when required by a cable installation sequence.

The apparatus for equipping plug housings with fitted-out cable ends of a plurality of cables, the cable ends being introduced into cells of the plug housings in a specific cable sequence by an equipping unit, comprises: a feeder unit for gripping leading and trailing ends of a cable; a store unit for temporarily retaining the trailing end of the cable; and a transfer station for receiving the leading and trailing ends of the cable from said feeder unit and releasing the leading and trailing ends to an equipping unit, whereby said feeder unit transfers the leading end of the cable to said transfer station and transfers the trailing end to one of said store unit and said transfer station according to a cable installation sequence involving at least one other cable to be installed by the equipping unit.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
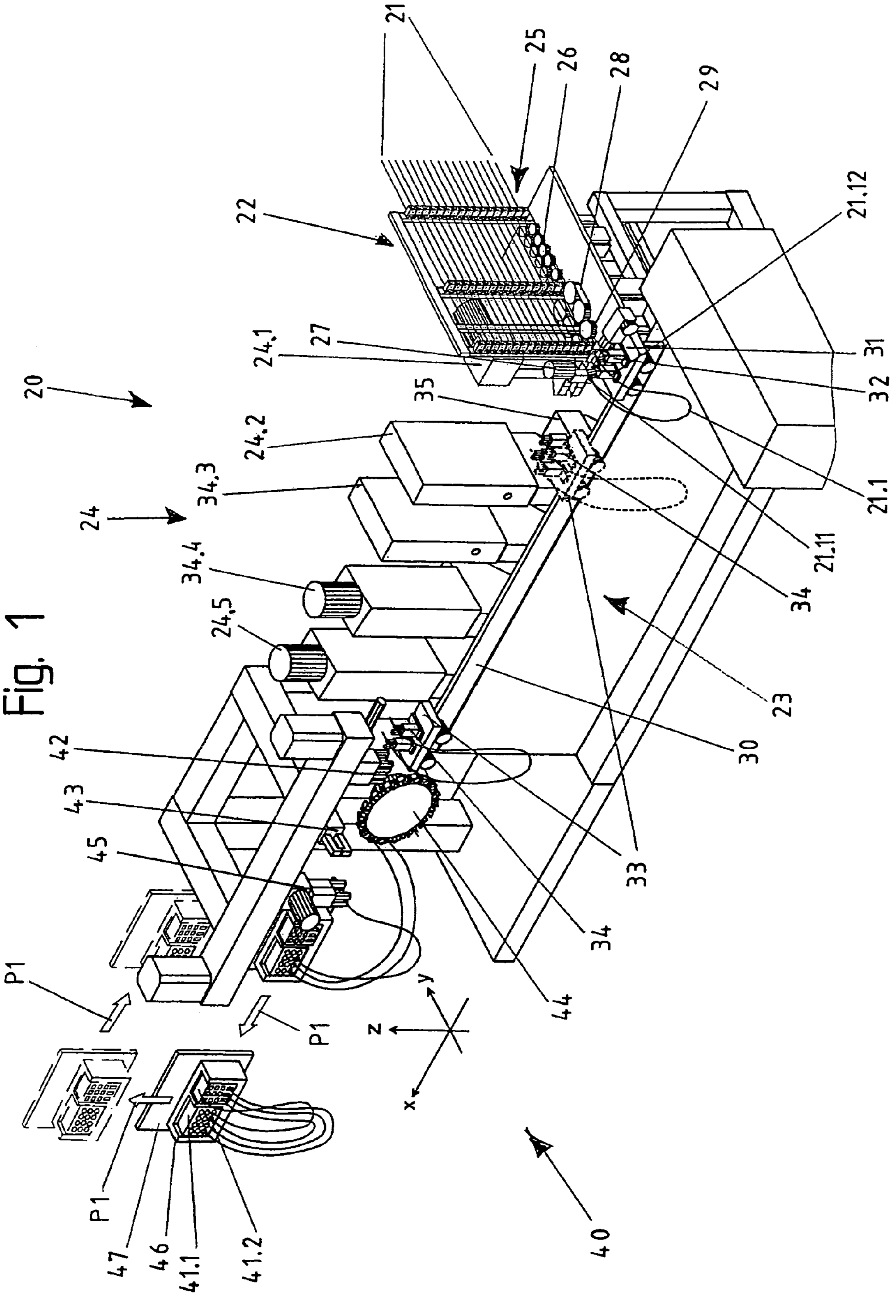
FIG. 1 shows a fitting-out installation with a downstream equipping installation according to the present invention.

FIG. 1 shows a fitting-out installation 20 for attaching connectors to cables 21, which installation includes a cable supply unit 22, a cable feeder unit 23 and a fitting-out unit 24. The fitting-out unit 24 can include, for example, an insulation-stripping station 24.1, a pair of bushing stations 24.2 and 24.3 and/or a pair crimping stations 24.4 and 24.5. Further and/or other forms of fitting-out stations are also possible depending upon the processes to be performed on the cables 21. In the cable supply unit 22, a plurality of the cables 21 are held in a cable changer 25 that is vertically adjustable. The cables 21 can be cables or conductors, including optical conductors, differing in matters of construction, diameter and color. A selected one of the cables 21 to be fitted-out is brought into alignment with a straightening path 26 by adjustment of the cable changer 25 in the vertical direction. A leading end of the cable 21 is gripped by a loop-laying device 27 and turned horizontally through 180°. At the same time, the cable 21 is advanced horizontally by means of a cable advancing device 28 and straightened by means of the straightening path 26. An encoder 29 measures the length of the advanced cable 21, wherein a cable loop 21.1 is formed by the advancing cable at the left side of the cable changer 25 at an output of the cable supply unit 22.

The cable feeder unit 23 includes a first transfer unit 31 and a second transfer unit 33. The transfer units are displaceable along a horizontally extending transfer guide 30, with the first transfer unit 31 having a first gripper unit 32 and the second transfer unit 33 having a second gripper unit 34. A first drive, which moves the first transfer unit 31 along the transfer guide 30, is not illustrated. A second drive, which moves the second drive unit 33 along the transfer guide 30, also is not illustrated. The first or second drive can be, for example, a stepping motor that linearly drives the associated one of the transfer units 31 and 33 by means of a cogged belt. As an alternative, the drive can be, for example, a linear drive with a linear motor. The direction of the movement of the transfer units 31 and 33 is denoted by an arrow "x" extending parallel to a longitudinal axis of the transfer guide 30. The movement directions of the gripper units 32 and 33 are denoted by an arrow "y" and an arrow "z" perpendicular to each other and the arrow "x". A control device (not illustrated) controls and monitors the fitting-out installation 20, wherein the movements of, in particular, the transfer units 31 and 33 and the gripper units 32 and 34 are freely programmable. Moreover, the control device can, during control of the transfer units 31 and 33 and the gripper units 32 and 34, immediately adapt the movement of, in particular, the gripper units 32 and 34 in the "y" direction to the cable diameter in the case of, for example, a change in the cable type to be fitted-out. A keyboard (not illustrated) and a display screen (not illustrated) serve as a man/machine interface for the control device.

In a starting position as shown in FIG. 1, the first gripper unit 32 takes over one cable end, identified as a leading cable end 21.11, of the cable loop 21.1 from the loop-laying device 27 and the other cable end, identified as a trailing cable end 21.12, from the cable changer 25. After cable cutting, the first transfer unit 31 moves to the insulation-stripping station 24.1 which removes the cable casing or insulation at the cable ends 21.11 and 21.12. After the insulation stripping process, the first transfer unit 31 together with the cable loop 21.1 moves on to a first transfer station 35, transfers the cable loop 21.1 to this station and moves back to the starting position. The second transfer unit 33 is positioned at the transfer station 35 as shown in dashed line. The second gripper unit 34 takes over the cable loop 21.1 at the first transfer station 35 and brings the cable loop to at least one bushing station 24.2 and 24.3 and/or to at least one crimping station 24.4 and 24.5 for one or more additional operations. Thereafter, the second transfer unit 33 together with the cable loop 21.1 fitted-out to a finished state moves into the end position shown in FIG. 1 in solid line and either waits or transfers the cable loop 21.1 to a further transfer station (not illustrated).

As shown in FIG. 1, an equipping installation 40 is arranged downstream of the fitting-out installation 20 and introduces the cable ends 21.11 and 21.12 fitted-out to the finished state into a first plug housing 41.1 and into a second plug housing 41.2, respectively. During the fitting-out process, a contact or connector for the first plug housing 41.1 was arranged at the leading cable end 21.11 and a contact or connector for the second plug housing 41.2 was arranged at the trailing cable end 21.12. A feeder unit 42 takes over the fitted-out cable loop 21.1 from the second transfer unit 33 (or from a further transfer station if necessary) and transfers the leading cable end 21.11 to a second transfer station 43. The feeder unit 42 transfers the trailing cable end 21.12 either to a store unit 44, which is, for example, rotatable, or, after the second transfer station 43 is again free of cable, to the second transfer station in accordance with the respective cable processing plan or method of assembly. An equipping unit 45 takes over the cable ends 21.11 and 21.12 in succession and positionally correct at the second transfer station 43 and introduces the cable ends 21.11 and 21.12 into the corresponding plug housings 41.1 and 41.2. The plug housings 41.1 and 41.2 are arranged in a housing holder 46 of a housing pallet 47.

The housing pallet 47 executes a movement represented by a plurality of arrows P1, wherein the stocking of the pallet 47 with the housings 41.1 and 41.2 and the removal of the cable equipped housings 41.1 and 41.2 can be carried out manually or automatically. The feeder unit 42, the store unit 44, the second transfer station 43, the equipping unit 45 and the plug housings 41.1 and 41.2 are arranged adjacent to one another or in a row. The plug housings 41.1 and 41.2 are oriented in a like manner and when equipped with the cable ends 21.11 and 21.12 are transported in that like manner. The movement necessary in the "z" direction for equipping the housings 41.1 and 41.2 with the cables 21 (movement for the next higher cell line) can be executed either by the equipping unit 45 or by the pallet 47.

Figure 2:
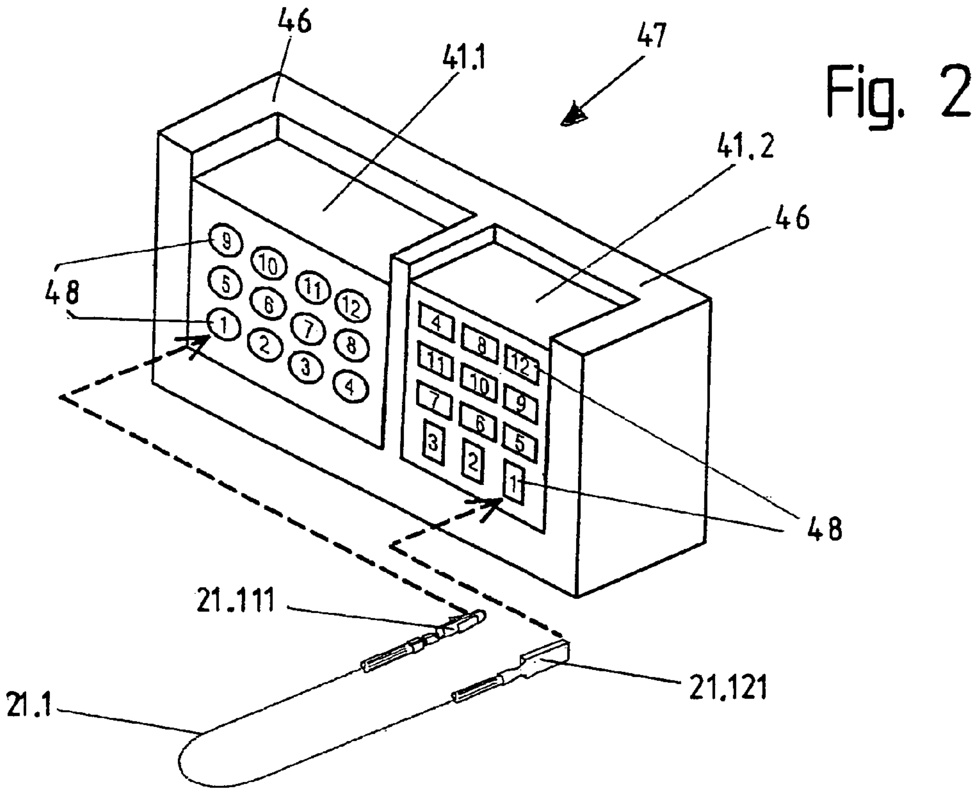
FIG. 2 shows a cable installation method for equipping plug housings according to the present invention.

FIG. 2 shows the first housing 41.1 and the second housing 41.2, arranged for cable installation in the housing holder 46 at the pallet 47, wherein each of the housings has a plurality of cells 48 (plugs, sockets, connectors, etc.) for reception of the connectors on the cables 21. So that the equipping unit 45 can be moved up to the cells 48 without obstruction, the cables 21 must be installed in the lowermost cell line first from left to right, then the next higher cell line from left to right and finally the uppermost cell line. FIG. 2 shows the cable plan or the cable installation sequence for the leading cable ends 21.11 of the cable loops 21.1, wherein the first housing 41.1 has twelve cells 48 (1–12) for reception of twelve leading cable ends each with, for example, a respective connector or contact sleeve 21.111. The cable delivery sequence corresponds with the cable equipping sequence. In the case of the second housing 41.2, for reception of the trailing cable ends 21.12, the cable sequence does not correspond with the first housing equipping sequence. In the second housing 41.2, the trailing cable end 21.12 of the third cable loop 21.1 must be installed first in the lower left cell (3), then the trailing cable end of the second cable loop and subsequently the trailing cable end of the first cable loop 21.1 to complete the lower row of cells 48.

In order to implement the above-described equipping sequence, the trailing cable ends 21.12, which, for example, are each provided with a respective connector or cable lug 21.121, of the first and second cable loops 21.1 are intermediately stored in the store unit 24. The trailing cable end 21.12 of the third cable loop 21.1 can be installed without intermediate storage after which the trailing cable end 21.12 of the second cable loop 21.1 and then the trailing cable end 21.12 of the first cable loop 21.1 are introduced into the corresponding cells 48 in the second housing 41.2 in the lowermost cell line. An analogous equipping sequence results for the next higher cell line and the cell line above that, wherein the trailing cable ends 21.12 of the seventh and eleventh cable loops 21.1 are installed without intermediate storage and the trailing cable ends 21.12 of the remaining cable loops 21.1 are installed in each case with intermediate storage. Still further plug housings can also be provided, which are interconnected by means of cable loops or are connected with the first or second plug housing, wherein the further plug housings, with exception of the last plug housing, also can be equipped with leading cable ends.

Figure 3:
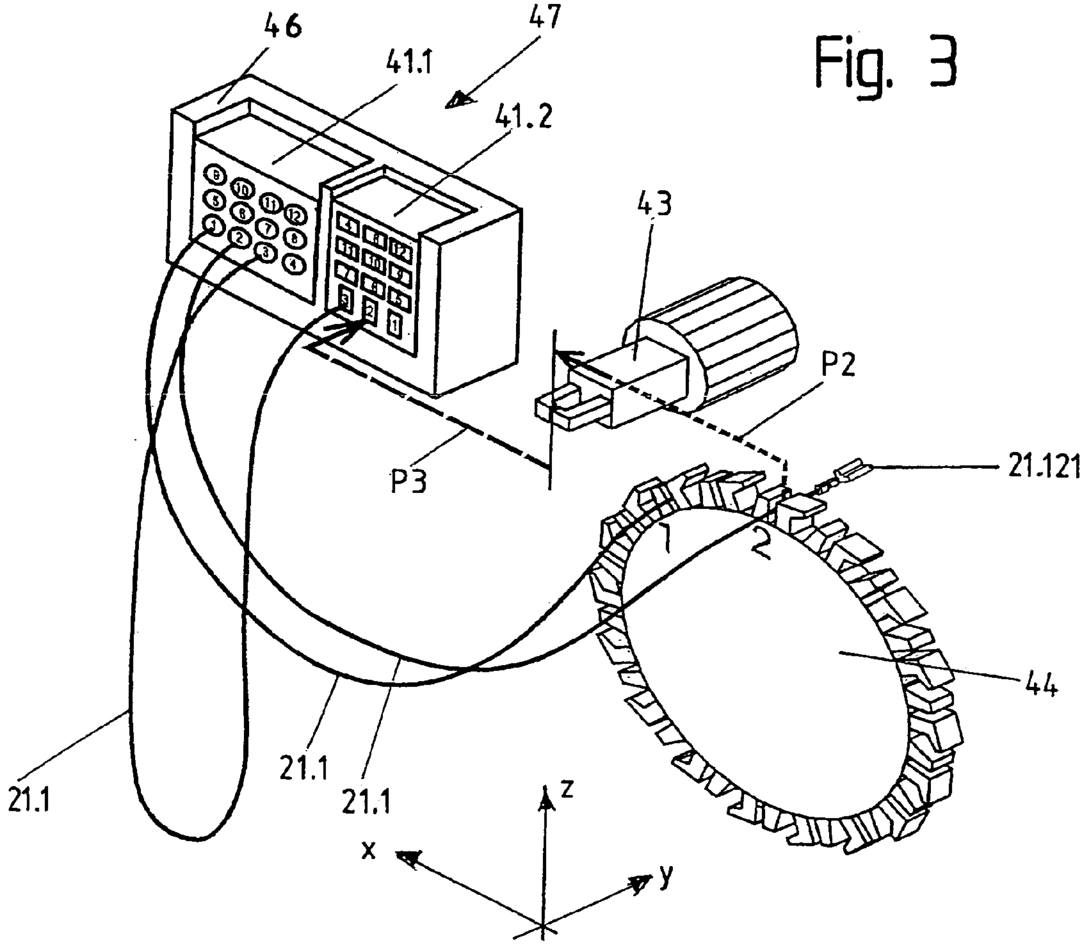
FIG. 3 shows the method for equipping of a first housing and a second housing with cable ends inserted in cells of the housings according to the present invention.

FIG. 3 shows the method of equipping of the first housing 41.1 and of the second housing 41.2 with the cable ends 21.11 and 21.12 of the first three cable loops 21.1. In the first housing 41.1 the leading cable ends 21.11 of the first three cable loops 21.1 are already installed, wherein the trailing cable ends 21.12 of the first and second cable loops are stored in the store unit 44 and the trailing cable end of the third cable loop is installed in the second housing 41.2 without intermediate storage. The feeder unit 42 (FIG. 1) then takes over the trailing cable end 21.12 of the second cable loop 21.1 from the store unit 44 and transfers it to the second transfer station 43. The movement of the feeder unit 42 in the "z" direction and in the "x" direction is represented by an arrow P2. If necessary, the cable lug 21.121 of the trailing cable end 21.12 is turned through, for example, 90°. The equipping unit 45 takes over the trailing cable end 21.12 of the second cable loop 21.1 from the second transfer station 43 correct in position and thus equips the corresponding cell 48 of the second housing 41.2. The movement of the equipping unit 45 in the "x" direction and in the "y" direction is represented by an arrow P3. Subsequently, the trailing cable end 21.12 of the first cable loop 21.1 is introduced in an analogous manner into the corresponding cell 48 of the second housing 41.2.

Figure 4:
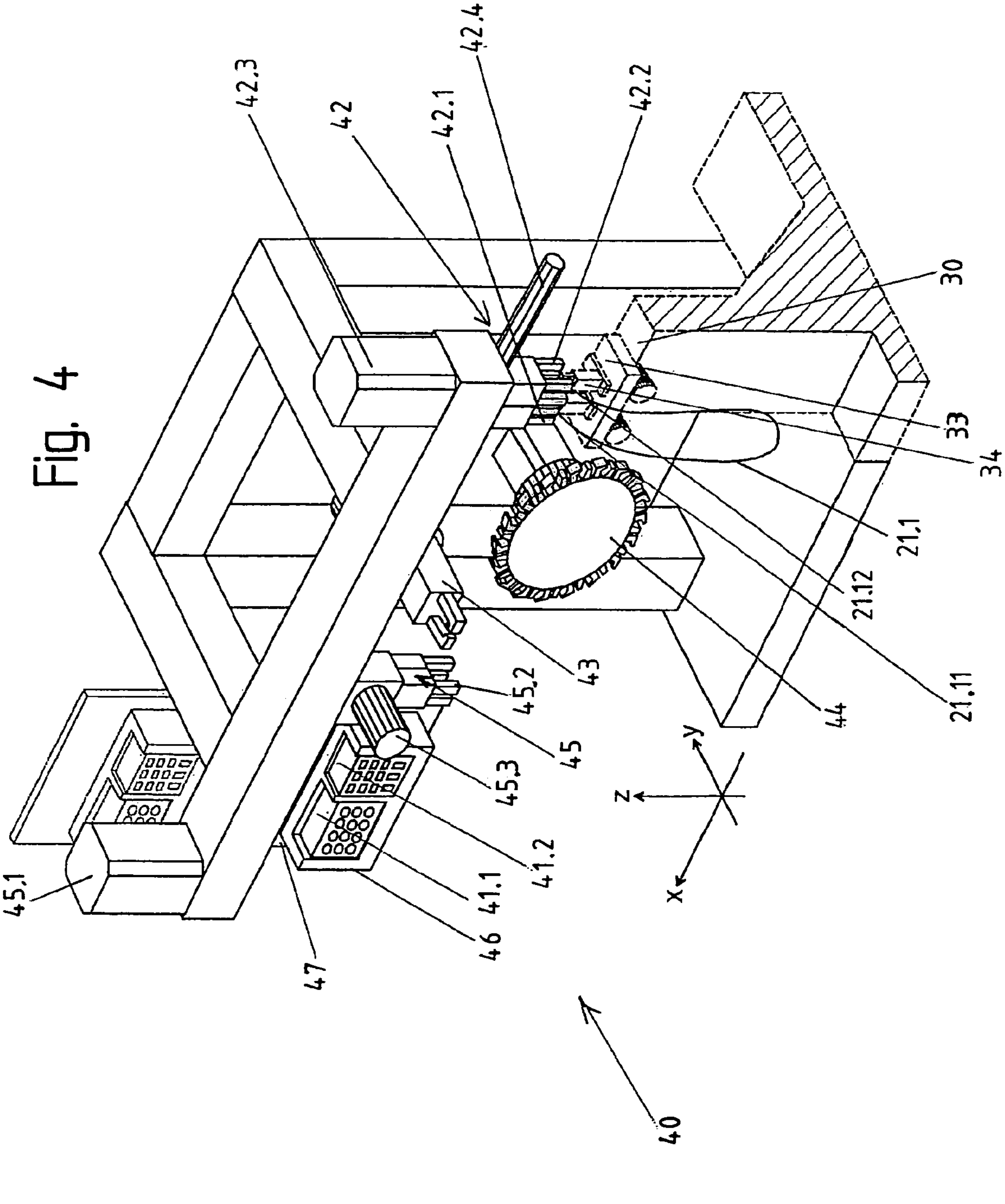
FIG. 4 shows the feeder unit of FIG. 1 during take-over of a cable loop.

FIG. 4 shows the feeder unit 42 during the take-over of a cable loop 21.1 from the second transfer unit 33. The feeder unit 42 includes a first gripper 42.1 for the leading cable end 21.11 and a second gripper 42.2 for the trailing cable end 21.12, wherein a first drive 42.3 for the movement of the grippers in the "x" direction and a second drive 42.4 for the movement in the "x" direction of the first gripper 42.1 relative to the second gripper 42.2 are provided. The first drive 42.3 can be, for example, a stepping motor that linearly drives the grippers 42.1 and 42.2 by means of a cogged belt. As a variant form, the drive can also be, for example, a linear drive with a linear motor. The second drive 42.4, can be, for example, a pneumatic cylinder.

Figure 5:
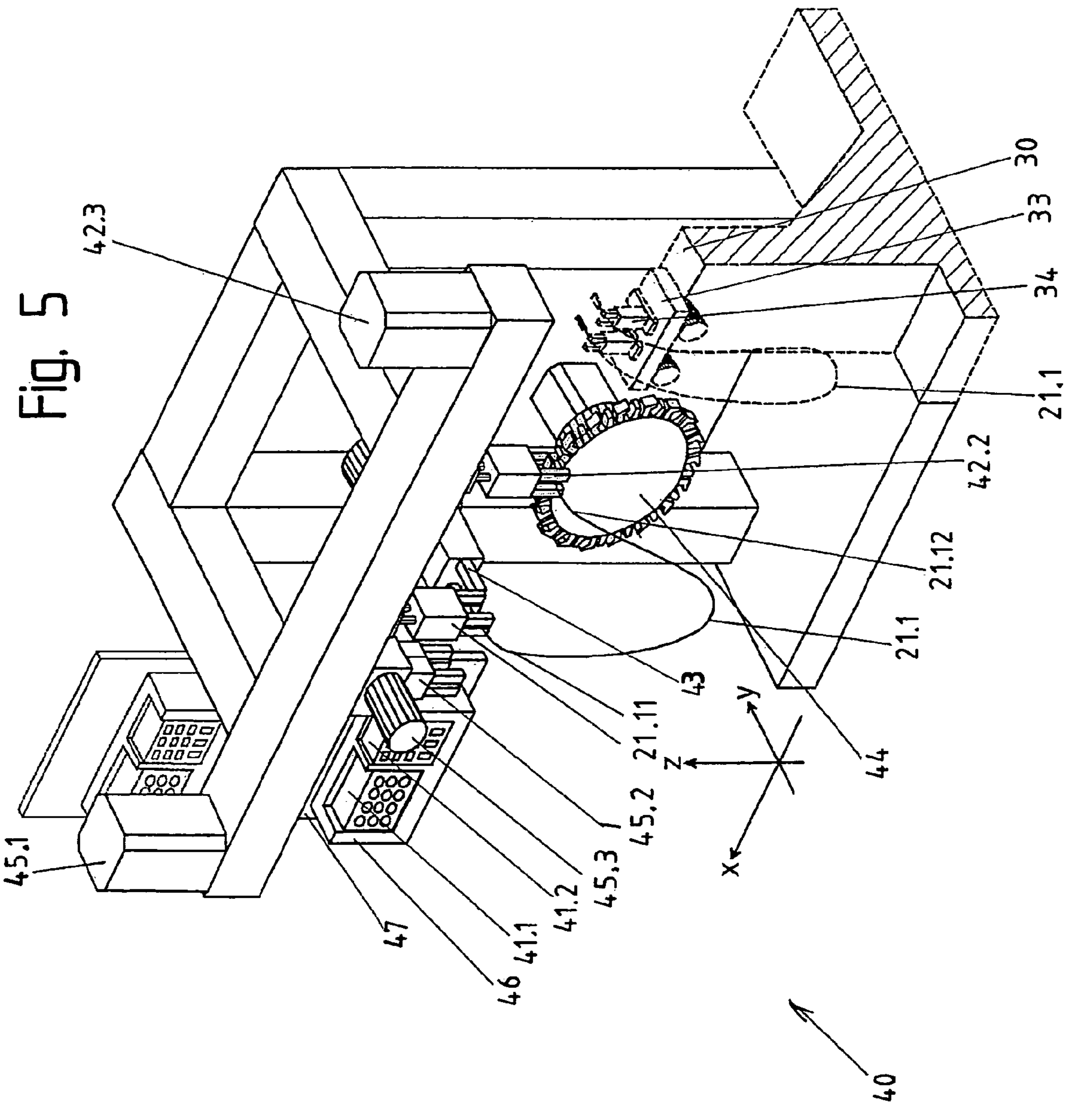
FIG. 5 shows the feeder unit of FIG. 4 during delivery of a leading cable end and a trailing cable end.

FIG. 5 shows the feeder unit 42 during delivery of the leading cable end 21.11 to the second transfer station 43 and the trailing cable end 21.12 to the store unit 44. The first drive 42.3 has previously moved both grippers 42.1, 42.2 in the "x" direction. At the same time the second drive 42.4 has moved the first gripper 42.1 relative to the second gripper 42.2 in the "x" direction. The second transfer unit 33 stands ready with the second cable loop 21.1. The second transfer station 43, which is provided with a drive for the "z" direction, is stationary and can in case of need turn the fixedly held contact sleeve 21.111 of the leading cable end 21.11 or the fixedly held cable lug 21.121 of the trailing cable end 21.12 through, for example 90°. If the contact sleeve 21.111 or the cable lug 21.121 has detent elements that are disruptive for cable transport, the cable end is firmly held at the cable.

Figure 6:
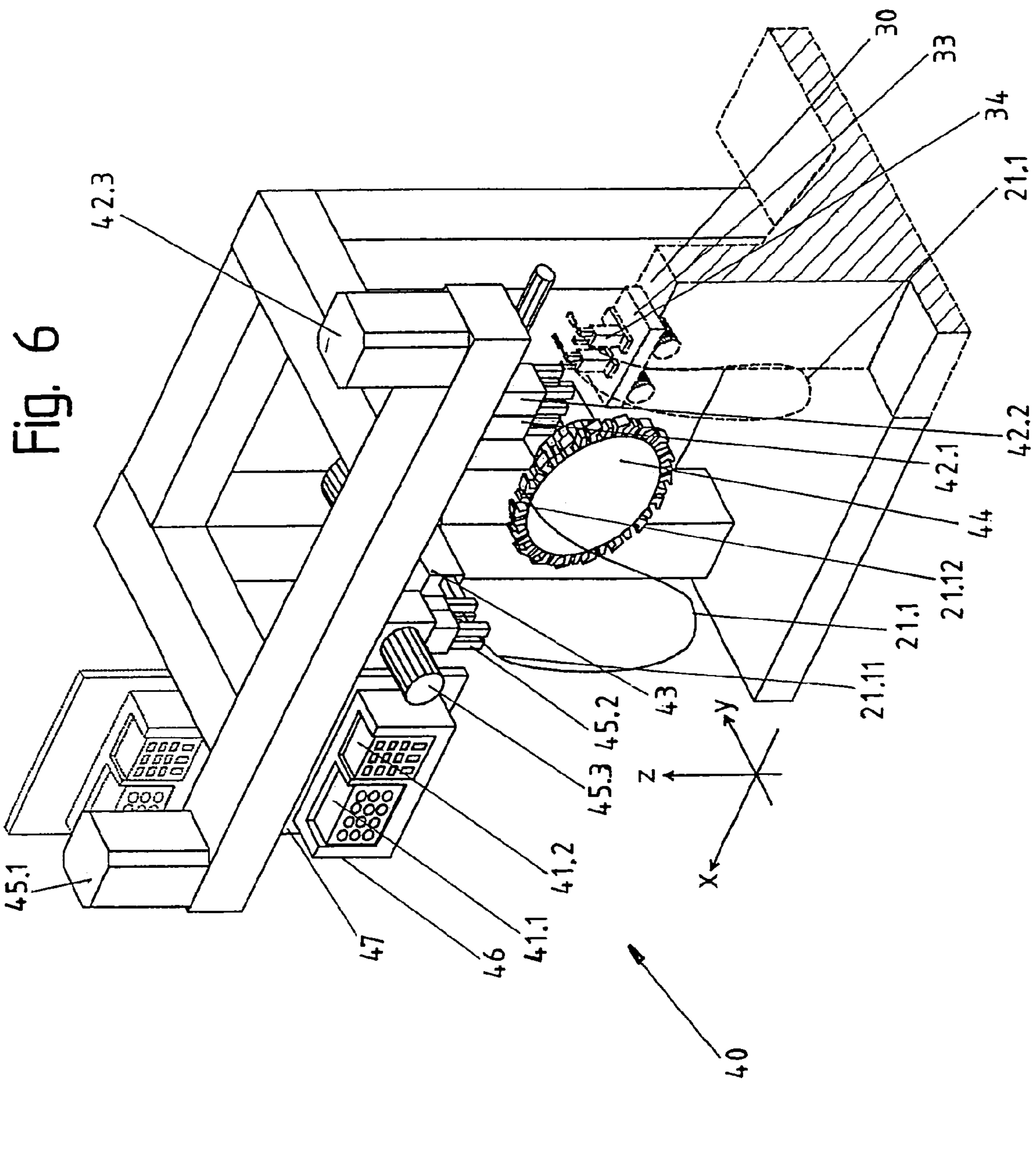
FIG. 6 shows the equipping unit of FIG. 1 during take-over of the leading cable end.

FIG. 6 shows the equipping unit 45 during take-over of the leading cable end 21.11 of the first cable loop 21.1. A first drive 45.1 moves a gripper 45.2 in the "x" direction up to the second transfer station 43. The first drive 45.1 can be, for example, a stepping motor that linearly drives the gripper 45.2 by means of a cogged belt. As a variant form, the drive can also be, for example, a linear drive with a linear motor. A second drive 45.3 produces the movement in the "y" direction necessary for the equipping. The feeder unit 42 is on the path back into the starting position for take-over of the second cable loop 21.1 from the second transfer unit 33.

Figure 7:
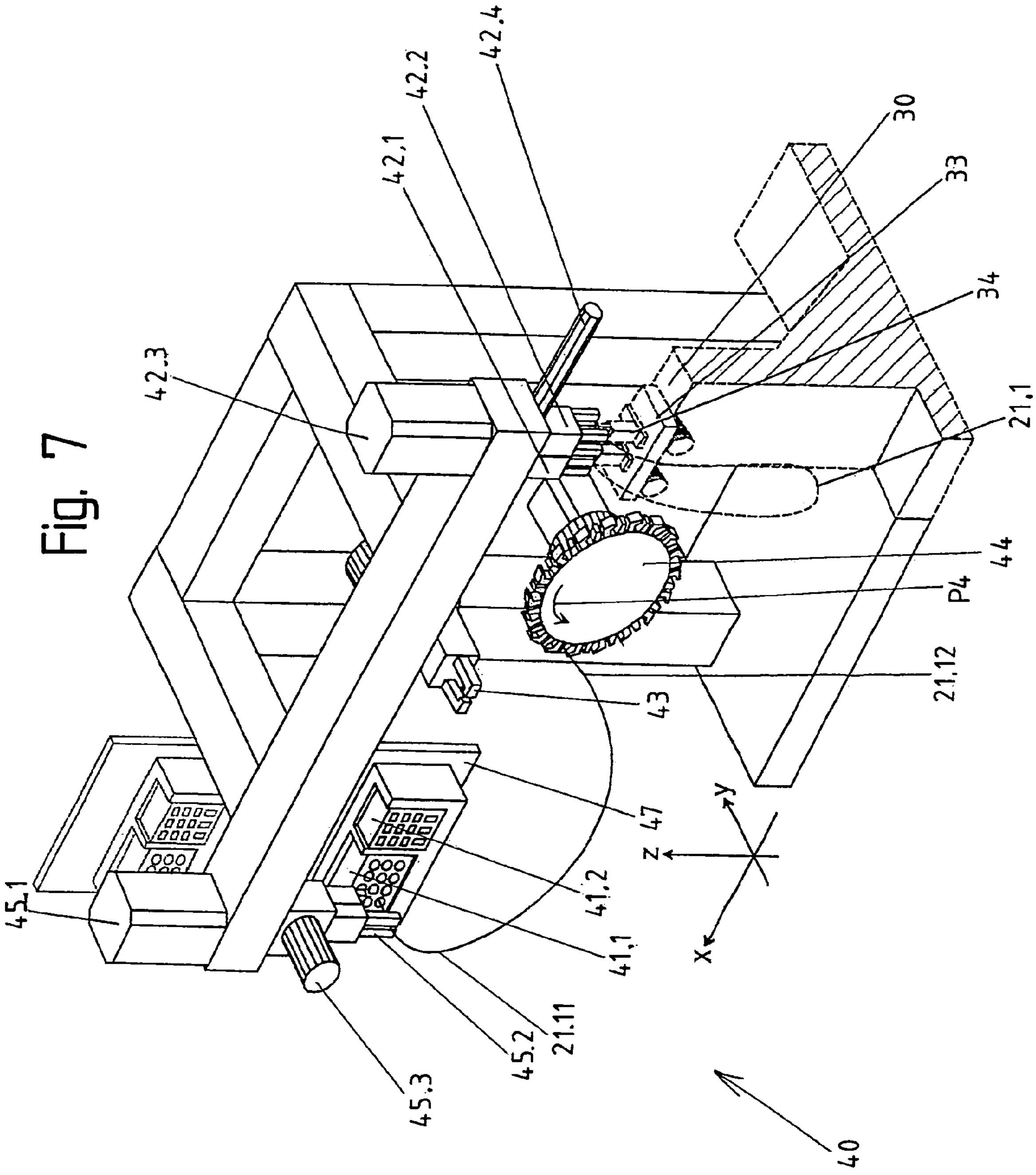
FIG. 7 shows the equipping unit of FIG. 6 during equipping of a plug housing with the leading cable end.

FIG. 7 shows the equipping unit 45 during equipping of the first housing 41.1 with the leading cable end 21.11 of the first cable loop 21.1. The second drive 45.3 moves the gripper 45.2 in the "y" direction until the contact sleeve 21.111 is arranged completely in the cell 48. The store unit 44 rotates in the direction represented by an arrow P4, so that further trailing cable ends 21.12 can be intermediately stored. In the interim the feeder unit 42 has taken over the second cable loop 21.1 from the second transfer unit 33.

Figure 8:
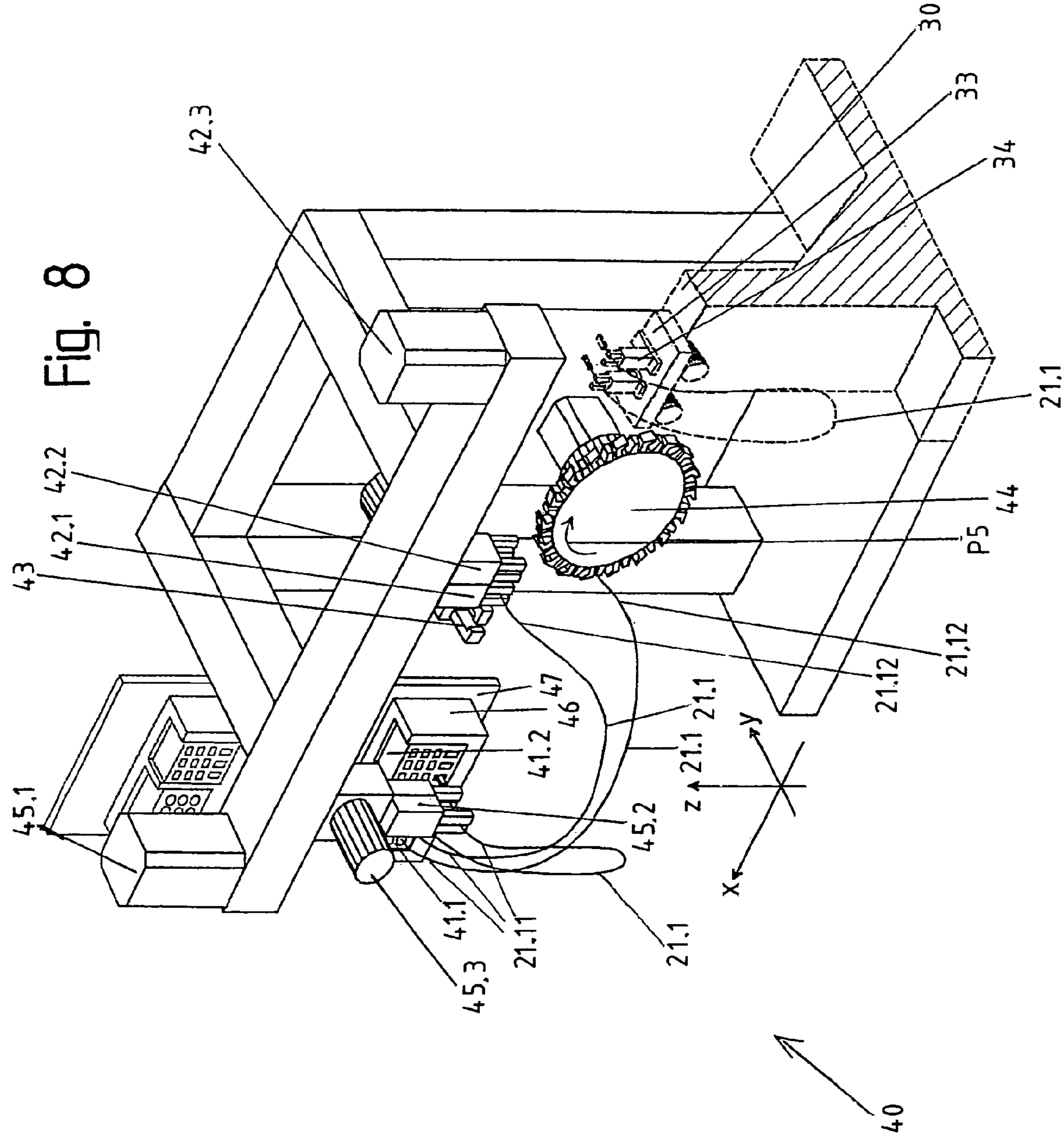
FIG. 8 shows the equipping unit of FIG. 7 during equipping of a plug housing with further cable ends.

FIG. 8 shows the equipping unit 45 during equipping of the second plug housing 41.2 with the trailing cable end 21.12 of the third cable loop 21.1. The first plug housing 41.1 is already equipped with the leading cable ends 21.11 of the first, second and third cable loops 21.1. Due to the cable sequence in the second plug housing 41.2, the trailing cable end of the first cable loop is deposited in the store unit 44 and the trailing cable end of the second cable loop is removed from the store unit by means of the feeder unit 42. The feeder unit 42 transfers the trailing cable end 21.12 of the second cable loop 21.1 to the second transfer station 43. The equipping unit 45 equips the second plug housing 41.2 with the trailing cable end 21.12 of the third cable loop 21.1. Thereafter, the equipping unit 45 takes over the trailing cable end 21.12 of the second cable loop 21.1 from the second transfer station 43 and equips the second plug housing 41.2. The store 44 is rotated in the direction represented by an arrow P5 for removal of the trailing cable end 21.12 of the first cable loop 21.1 from the store unit 44. The feeder unit 42 removes the trailing cable end 21.12 of the first cable loop 21.1 and transfers the trailing cable end of the first cable loop to the second transfer station 43. Thereafter, the equipping unit 45 equips the second plug housing 41.2 with the trailing cable end 21.12 of the first cable loop 21.1.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for equipping plug housings with fitted-out cable ends of a plurality of cables, the cable ends being introduced into cells of the plug housings in a specific cable sequence by an equipping unit, comprising:

a feeder unit for gripping leading and trailing ends of a cable;

a store unit for temporarily retaining the trailing end of the cable; and a transfer station for receiving the leading and trailing ends of the cable from said feeder unit and releasing the leading and trailing ends to an equipping unit, whereby when said feeder unit transfers the leading end of the cable to said transfer station and transfers the trailing end to said store unit according to a cable installation sequence involving at least one other cable to be installed by the equipping unit, said store unit transfers the trailing end to said transfer station after the at least one other cable is installed by the equipping unit.

2. The apparatus according to claim 1 wherein said transfer station presents the cable ends to the equipping unit in correct positions for installation into plug housings.

3. The apparatus according to claim 2 wherein said transfer station turns at least one of the leading and trailing ends to the correct position.

4. The apparatus according to claim 1 wherein said feeder unit, said store unit, and said transfer station are arranged in a row with the equipping unit and a holder for the plug housings.

5. The apparatus according to claim 1 wherein said feeder unit includes a pair of grippers movable relative to one another, each said gripper gripping an associated one of the leading and trailing ends of the cable.

6. The apparatus according to claim 1 wherein said store unit rotates relative to said feeder unit for receiving a trailing end of each of at least two cables.

7. The apparatus according to claim 1 wherein said store unit rotates relative to said transfer station to transfer a stored trailing end to said transfer station.

8. An apparatus for equipping plug housings with fitted-out cable ends of a plurality of cables, the cable ends being introduced into cells of the plug housings in a specific cable sequence by an equipping unit, comprising:

a feeder unit for gripping leading and trailing ends of a cable;

a store unit for temporarily retaining the cable trailing end;

an equipping unit for installing the cable leading and trailing ends in plug housings; and a transfer station for receiving the cable leading and trailing ends from said feeder unit and releasing the leading and trailing ends to said equipping unit, whereby when said feeder unit transfers the cable trailing end to said store unit according to a cable installation sequence involving at least one other cable to be installed by said equipping unit, said store unit transfers the cable trailing end to said transfer station after the at least one other cable is installed by said equipping unit.

9. The apparatus according to claim 8 wherein said transfer station presents the cable leading and trailing ends to said equipping unit in correct positions for installation into the plug housings.

10. The apparatus according to claim 8 wherein said feeder unit, said store unit, said equipping unit and said transfer station are arranged in a row with the plug housings.

11. The apparatus according to claim 8 wherein said feeder unit includes a pair of grippers movable relative to one another, each said gripper gripping an associated one of the cable leading and trailing ends.

12. The apparatus according to claim 8 wherein said store unit rotates relative to said feeder unit for receiving the cable trailing end and a trailing end of at least one other cable.

13. The apparatus according to claim 8 wherein said store unit rotates relative to said transfer station to transfer the retained cable trailing end to said transfer station.

* * * * *